United States Patent
Arndt (10) Patent No.: US 7,529,768 B2
(45) Date of Patent: May 5, 2009

(54) DETERMINING WHICH OBJECTS TO PLACE IN A CONTAINER BASED ON RELATIONSHIPS OF THE OBJECTS

(75) Inventor: Karla Kay Arndt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/297,292

(22) Filed: Dec. 8, 2005

(65) Prior Publication Data

US 2007/0136350 A1    Jun. 14, 2007

(51) Int. Cl.
*G06F 7/00* (2006.01)
(52) U.S. Cl. .............................. 707/102; 707/3; 707/10; 707/E17.12; 711/118; 711/133; 709/203
(58) Field of Classification Search .................. None
See application file for complete search history.

(56) References Cited

U.S. PATENT DOCUMENTS

| | | | |
|---|---|---|---|
| 6,192,470 B1 * | 2/2001 | Kelley et al. ..................... 713/1 |
| 6,457,020 B1 | 9/2002 | Carey et al. |
| 6,539,382 B1 * | 3/2003 | Byrne et al. ................... 707/10 |
| 6,904,433 B2 * | 6/2005 | Kapitskaia et al. ............. 707/10 |
| 2004/0024811 A1 * | 2/2004 | Kitada et al. ................. 709/203 |
| 2005/0021661 A1 * | 1/2005 | Duloutre et al. .............. 709/217 |
| 2005/0203897 A1 * | 9/2005 | Kapitskaia et al. .............. 707/3 |

OTHER PUBLICATIONS

Ekow Otoo, Optimal file-bundle caching algorithms for data-grids, IEEE. 2004. pp. 1-8.*

* cited by examiner

*Primary Examiner*—Don Wong
*Assistant Examiner*—Shyue Jiunn Hwa
(74) *Attorney, Agent, or Firm*—Martin & Associates, LLC; Derek P. Martin (57) ABSTRACT

An apparatus and method to analyze relationships of objects when all objects in combinations are required for the problem resolution to determine which objects to place in a container (cache) to thereby improve database performance and utility. Preferred embodiments are illustrated with respect to attribute caching in a computer database system, where the attributes or objects that need to be cached are not individual attributes, but combinations of attributes where including one object affects all combinations in which it exists. In other preferred embodiments, attribute caching is described where including a combination of objects affects all other combinations that contain one or more of the individual objects in the included combination.

12 Claims, 5 Drawing Sheets

| Object 410 | Access Rate 420 | Size 430 | Benefit Ratio (Access rate/ Size) 440 |
|---|---|---|---|
| CNObjectclass | 500 | 1500 | 0.33 |
| CNObjectclassUID | 600 | 2250 | 0.27 |
| CNSNTitle | 250 | 1200 | 0.21 |
| GivennameSN | 200 | 650 | 0.31 |
| ObjectclassSNUID | 800 | 2250 | 0.36 |

| Object 410 |
|---|
| Givenname |
| SN |
| Objectclass |
| SN |
| UID |

| Object 410 | Access Rate 420 | Size Not Yet Included 630 | Benefit Ratio (access rate/size not yet included) 640 |
|---|---|---|---|
| CN~~Objectclass~~ | 500 | ~~1500~~ 500 | ~~0.33~~ 1.00 |
| CN~~ObjectclassUID~~ | 600 | ~~2250~~ 500 | ~~0.27~~ 1.20 |
| CN~~SN~~Title | 250 | ~~1200~~ 700 | ~~0.21~~ 0.36 |
| Givenname~~SN~~ | 200 | ~~650~~ 150 | ~~0.31~~ 1.33 |

DETERMINING WHICH OBJECTS TO PLACE IN A CONTAINER BASED ON RELATIONSHIPS OF THE OBJECTS

BACKGROUND OF THE INVENTION

1. Technical Field

This invention generally relates to computer data systems, and more specifically relates to an apparatus and methods for analyzing relationships of objects when all objects in combinations are required for problem resolution to determine which objects to place in a container (cache) to improve system performance.

2. Background Art

Computing which items are most advantageous to keep when not all items can fit within a given container constraint is known as a "knapsack" problem. Solutions to this problem are discussed in resources such as the book Knapsack Problems: Algorithms and Computer Implementations by Silvano Martello and Paolo Toth. This book and other published papers address the most efficient algorithms and various problems with existing algorithms in order to solve the problem of finding the correct subset of individual objects to add to a container within a given constraint. However, these references do not solve the problem of how to analyze the objects' relationships when individual objects alone are not the items to be added to the container. In these cases, it is a combination of individual objects that are required in the container for a search request, and by including one combination, other combinations become more advantageous to include.

Attribute caching in a computer directory server is a specific case where knapsack problems are encountered. A type of directory server common in the art is the Lightweight Directory Access Protocol (LDAP) directory. LDAP is an Internet protocol that is used by programs to look up information from an LDAP repository or directory. Thus, LDAP defines the "language" used by client programs to talk to LDAP servers which can store data in any type of repository. On the client side, a client may be an email program, a printer browser, or an address book. LDAP also defines permissions, set by the administrator to allow only certain people to access the data stored in the LDAP directory structure, and optionally keep certain data private. An LDAP schema is a way to describe the format and attributes of data in the server.

Some LDAP type directory servers have a feature known as attribute caching that allows server administrators to define a set of attributes to cache in memory as well as to configure the maximum amount of memory to use for this caching. These attributes are stored in database tables but continually accessing these tables to resolve LDAP searches requires excessive system resources, so the attributes are cached in memory to increase efficiency. If all attributes necessary for resolving an LDAP search are found in the attribute caches in memory, the search will be resolved quickly in memory by the directory server rather than using database queries against the database tables. Therefore, attribute caching is a performance enhancing feature of the directory server.

Attribute caching in the prior art is incredibly difficult to configure. The administrator needs to understand the types of searches done by all applications accessing the server. Even though the server reports which attributes were most frequently used in search filters, it simply cannot report the relationships between the attributes along with all the attributes required to resolve every type of search filter used in the applications and expect the administrator to configure it manually based on real-time usage.

Without a way to cache objects more efficiently when the individual objects are not the items to be added to the container (such as a memory cache), the computer industry will continue to suffer from inefficiency and poor performance.

DISCLOSURE OF INVENTION

In accordance with the preferred embodiments, an apparatus and method analyze relationships of objects when all objects in combinations are required for the problem resolution to determine which objects to place in a container (cache) to thereby improve database performance and utility. Preferred embodiments are illustrated with respect to attribute caching in a computer database system, where the attributes or objects that need to be cached are not individual attributes, but combinations of attributes where including one object affects all combinations in which it exists. In other preferred embodiments, attribute caching is described where including a combination of objects affects all other combinations that contain one or more of the individual objects in the included combination.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to an apparatus and method to analyze relationships of objects when all objects in combinations are required for the problem resolution. The preferred embodiments are illustrated with respect to attribute caching in a computer database system. For those not familiar with databases and attribute caching, this Overview section provides additional background information that will help to understand the present invention.

Prior Art knapsack Method and Attribute Caching

The prior art knapsack method is a systematic way to determine what are the most cost beneficial items to store in fast access memory (the knapsack) to decrease the access time for often used items. A basic knapsack routine takes the individual objects, their relative value, and their cost and creates a benefit ratio that is then used against a space constraint to determine which objects are the most beneficial to place in the knapsack.

Figure 2:
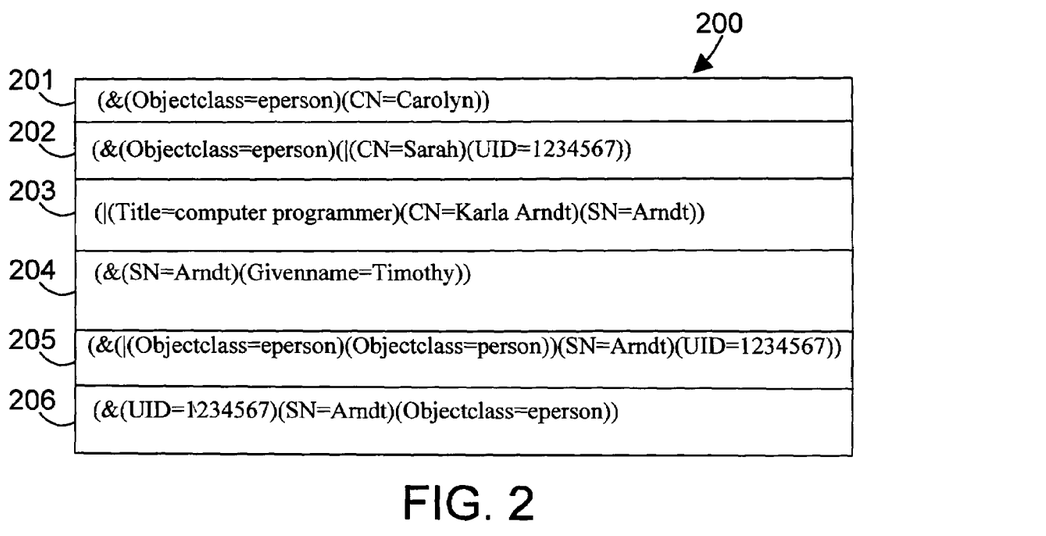
FIG. 2 is a table of filters used for illustrating examples according to the prior art and the preferred embodiments.

FIG. 2 shows a set of search filters used for examples described further below. The filters are produced by an application using LDAP to access data in an LDAP repository. For example, the first filter 201 is looking for records in the repository that contain the objectclass equal to "eperson" AND have the common name of "Carolyn." Similarly, the filter 202 is looking for records that contain the Objectclass equal to "eperson" AND the common name of "Sarah" OR the UID of "1234567." The filter 203 is looking for records that contain the title equal to "computer programmer" OR the common name of "Karla" OR the surname of "Arndt." The filter 204 is looking for records that contain the SN (surname) equal to "Arndt AND the Givenname of "Timothy." The filter 205 is looking for records in the repository that contain the objectclass equal to "eperson" OR "person" AND have the SN of "Arndt" and the UID of "1234567." The filter 206 is looking for records in the repository that contain the UID equal to "1234567" AND have the SN of "Arndt" AND Objectclass equal to "eperson."

Figure 3:
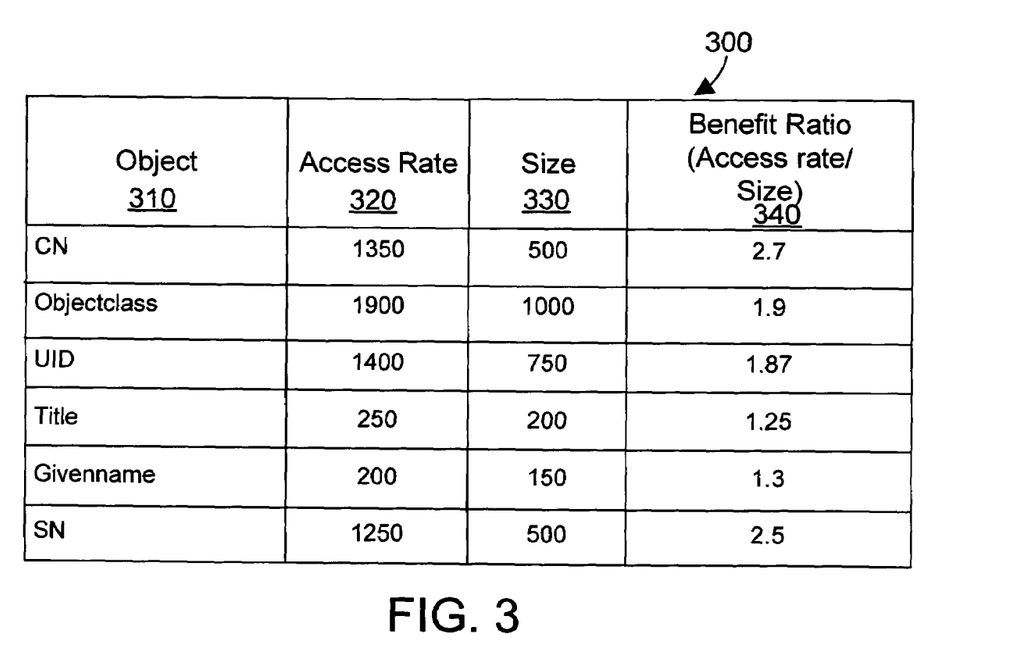
FIG. 3 is a table of objects related to the filters in FIG. 2 for illustrating examples of attribute caching according to the prior art and the preferred embodiments.

The table 300 in FIG. 3 shows the 6 individual objects 310 that correspond to the objects of the search filters shown in FIG. 2. The information in table 300 is available from the LDAP server. For each object 310, FIG. 3 shows an access rate 320, a data size 330 required for each object, and a benefit ratio 340. The benefit ratio 340 provides a convenient way to compare the relative value of storing the different objects. The benefit ratio is determined by dividing the access rate 320 by the size 330.

The tables in FIGS. 2 and 3 are used to show an example of a prior art knapsack method to determine what items to place in a cache. In this method according to the prior art, the individual objects were analyzed to determine which objects should be placed in the knapsack (cache). Depending on the size constraint of the knapsack, different objects would prove to be most beneficial to place in the knapsack. For example, for a given size constraint of the container, the prior art method would add objects to the cache, starting with the object which has the largest benefit ratio until the size constraint is met. For the constraint of 1500, the first object chosen would be CN because it has the largest benefit ratio (2.7) within the size constraint. The next object chosen would be SN for a combined size of 1000. The next object chosen would be Givenname followed by Title for a combined overall total size of 1350. Thus for the constraint of 1500, the prior art method would place the objects CN, SN, Givenname and Title in the cache.

Continuing with the previous prior art example, the size constraint of 3000 is now considered. With a size constraint of the container equal to 3000, the first two objects chosen would again be CN and SN, each with a size of 500, since they have the larger benefit ratios. The next object with the largest benefit ratio that fits within the remaining size constraint is Objectclass with a size of 1000. Since there still remains room within the constraint (3000 −500 −500 −1000 =1000) the object that has the highest benefit ratio and size less than or equal to 1000 is UID that has a size of 750. With space still remaining, the object Givenname is chosen as the last object that will fit in the container. The results of the objects placed in the knapsack for the constraint size of 3000 according the prior art method is CN, SN, UID, Objectclass and Givenname.

In the previous example, the choice of what to place in the cache was determined by only analyzing the individual objects of the search filters. However, when a search has a combined object, i.e. more than one object, the search filter cannot be resolved in memory unless all objects of the combination are included in the cache. Therefore, caching only single objects would be a waste of processing time and memory if the search filters are using combined objects and all the combined objects don't end up in the cache. Therefore, the relationships between the attributes used in the search filters must be understood in order to determine what combinations of attributes would be most advantageous to cache within the memory constraint defined by the system administrator.

Knapsack methods such as described above have been used in the prior art to determine what attributes to cache in a directory server environment. Attributes of accesses to information are stored by the directory server in memory to reduce the time for repeated accesses to the same information in the directory server. Attribute caching in the prior art is incredibly difficult to configure and is typically a manual process by a systems administrator. To configure attribute caching in the prior art, an administrator needs to understand the types of searches done by all the applications accessing the server. Even though the server reports which attributes were most frequently used in search filters, it does not report the relationships between the attributes along with all the attributes required to resolve every type of search filter used in the applications based on real-time usage. Further if it did report this much information, it would be extremely difficult for the administrator to analyze the information to configure attribute caching manually.

2.0 Detailed Description

While the prior art has addressed the "knapsack" problem of finding the correct subset of individual objects to add to a container within a given constraint, it has not addressed the problem of how to analyze the objects' relationships when individual objects are not the items to be added to the container. In the preferred embodiments the complete combination of objects that is required to be in the container is considered for placement in the container since the container can respond to the request only if all the objects are present. Further, the embodiments herein handle the scenario where including a combination of objects affects all other combinations that contain one or more of the individual objects in the included combination. In the preferred embodiments the object with the highest benefit ratio is not necessarily the object to choose for the given constraint if a combination of other individual objects provides a better overall benefit.

Figure 1:
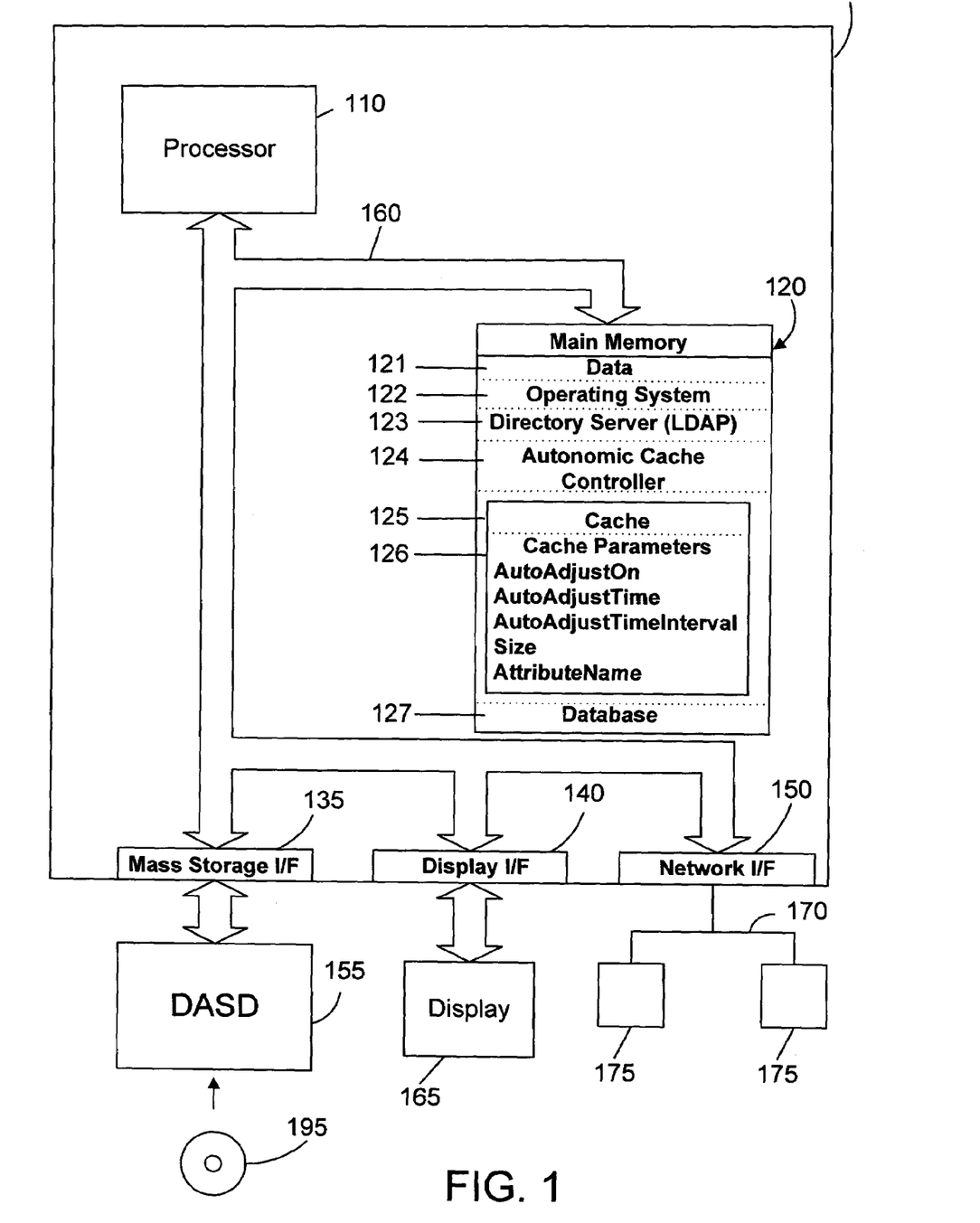
FIG. 1 is an apparatus in accordance with the preferred embodiments.

The preferred embodiments herein provide an apparatus and method to analyze relationships of objects when all objects in combinations are required for the problem resolution. Embodiments herein allow a directory administrator to set up autonomical control parameters for attribute caching in a directory server. Referring now to FIG. 1, a computer system 100 is one suitable implementation of an apparatus in accordance with the preferred embodiments of the invention.

Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 135, a display interface 140, and a network interface 150. These system components are interconnected through the use of a system bus 160. Mass storage interface 135 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, a directory server 123, an autonomic cache controller 124, a cache 125 and a database 127. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. In preferred embodiments herein, the memory 120 includes a directory server 123 as described further below. In preferred embodiments, the directory server 123 is an application. In other embodiments, the directory server 123 is part of the operating system 122. The memory 120 further comprises an autonomic cache controller 124, one or more attribute caches 125, and attribute cache parameters 126. The memory 120 also includes a database 127 that is any suitable database, whether currently known or developed in the future. Database 127 includes one or more tables (not shown).

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, directory server 123, autonomic cache controller 124, attribute cache 125, the attribute cache parameters 126, and the database 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 135, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links. Note that the preferred signal bearing media is tangible.

The preferred embodiments herein address the knapsack (cache) situation where the objects that need to be cached are not individual objects, but combinations of objects where including one object affects all combinations in which the object exists. An example will now be described according to embodiments of the present invention and represented in FIGS. 4 and 5. This example uses the same six LDAP search filters used in the above example and shown in FIG. 2, and uses the access rates and sizes for these objects as shown in FIG. 3.

Figure 4:
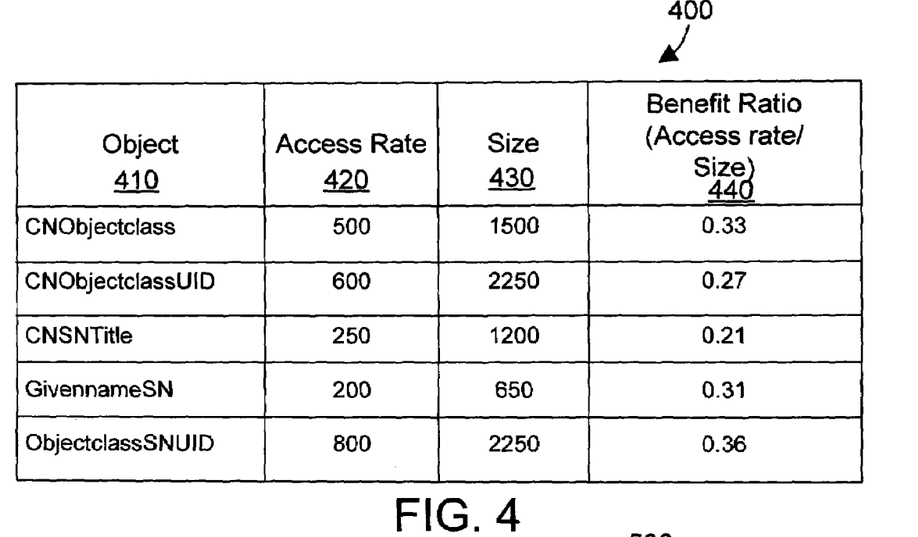
FIG. 4 is a table of combined objects related to the filters in FIG. 2 used to illustrate an example of attribute caching according to the preferred embodiments.

The table 400 in FIG. 4 shows 5 combined objects 410 that correspond to the 6 search filters 200 shown in FIG. 2. (While all the groups shown in table 400 are combined objects, the same methods described below would be used for a group of one object.) Two of the search filters 204, 205 have the same objects so they are combined into a single row in table 400. The information in table 400 is available from the LDAP directory server 123. For each combined object 410, FIG. 4 shows an access rate 420, a data size 430 required for each object, and a benefit ratio 440. The benefit ratio 440 provides a convenient way to compare the relative value of storing different objects. The benefit ratio is determined by dividing the access rate 420 by the size 430. In table 400, the objects 410 are not individual objects, but rather groups of objects required to resolve the search filter. The access rates 420 for each combination is as listed in the Figures. The access rate 420 is the number of times the attribute combinations were used in any search filter for any application on the server regardless of the value being searched, regardless of the complexity of the filter, and regardless of the number times the attribute was used in the filter. (In contrast, the access rate 220 of the individual objects shown in FIG. 3 reflect the sum of the combined access rates 420 that contain each object 220.) The size 430 of each combined object includes the size of each individual object as shown in FIG. 3. For example, the size 430 of the CNObjectclass object in FIG. 4 is 1500, which is the sum of the sizes of the individual CN object (500) and Objectclass (1000) shown in FIG. 3.

Again referring to FIG. 4, a first example will be described according to the preferred embodiments. In this example, the combined objects are analyzed to determine what combined objects should be placed in the cache. If the size constraint of the container is 1500, the first preferred embodiment would add combined objects to the cache, starting with the object which has the largest benefit ratio until the size constraint is met. For the constraint of 1500, the first object chosen would be CNObjectclass because it has the largest benefit ratio (0.33) within the size constraint. Since the size of CNObjectclass (1500) meets the size constraint, no other objects can be placed in the container (cache). Thus for the constraint of 1500, the first example of the preferred embodiments would only place the objects CN and Objectclass in the cache to allow for complete memory access for a search of the combined object CNObjectclass. According to this example, all the objects needed for a filter that uses the combined objects of CN and Object class. In the prior art example above, the objects placed in the container did not cover all the objects of any filter in the example, so the cache in the prior art was not effective.

Figure 5:
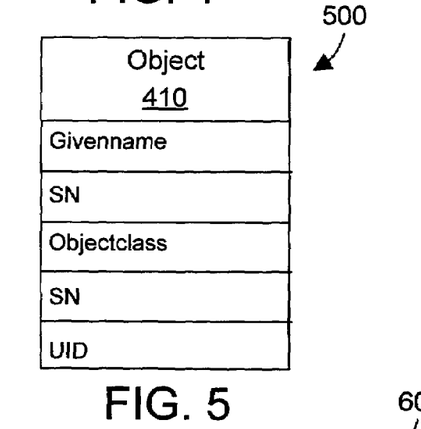
FIG. 5 is a table illustrating the results of an example of attribute caching according to the preferred embodiments.

Continuing with the example of the first preferred embodiment, a size constraint of 3000 is now considered. With a size constraint of the container equal to 3000, the first combined objects chosen would again be ObjectclassSNUID because it has the largest benefit ratio that fits in the size constraint. Since there is still available space in the cache container constraint (3000−2250=750), the next combined object with the largest benefit ratio that fits within the remaining constraint is determined. In this case, the combined object GivennameSN with a size of 650 is chosen as the last object that will fit in the container. The results of the objects placed in the knapsack for the constraint size of 3000 according this first preferred embodiment is shown in FIG. 5. The individual objects that would be placed in the container are Objectclass, SN, UID and Givenname. As can be seen from this example, the container may not have been most efficiently filled because the object SN was included in both combined objects.

Figure 6:
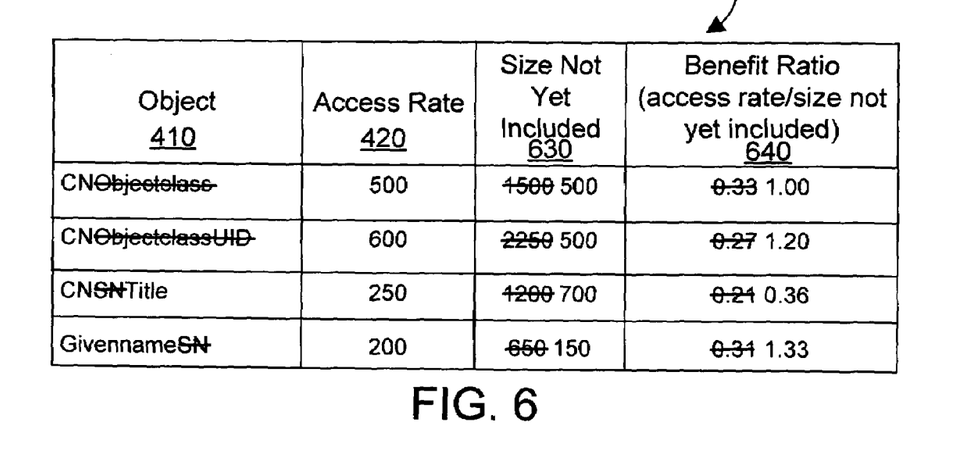
FIG. 6 is a table of combined objects related to the filters in FIG. 2 used to illustrate an example of attribute caching according to the preferred embodiments.
Figure 7:
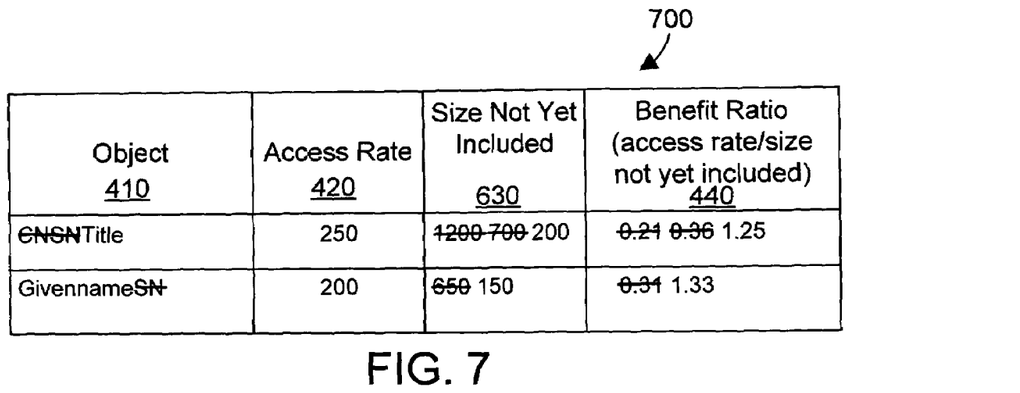
FIG. 7 is a table of combined objects for the example in FIG. 6 according to the preferred embodiments.
Figure 8:
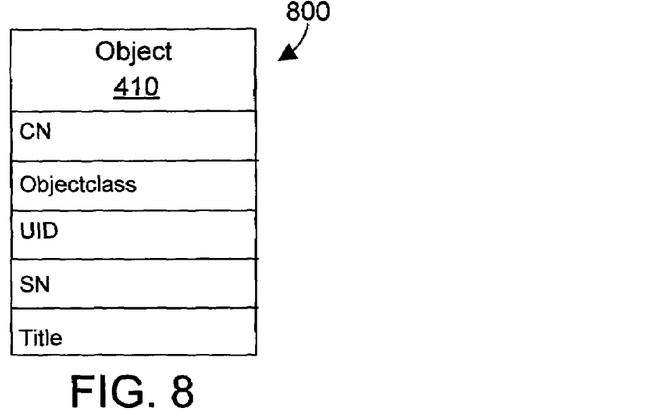
FIG. 8 is a table illustrating the results of an example of attribute caching according to the preferred embodiments.

FIGS. 6-8 use the same data shown in FIG. 4 to illustrate another example according to preferred embodiments herein. In these preferred embodiments, the cache can be more efficiently filled and give better overall system efficiency by considering the relationships of the combined objects already placed in the container before considering the next combined object to place in the container. To do this, the size 630 of the combined object is considered to be the size of the object "not yet included" in the container. The size 630 is initially the total size of all attributes in the group required to be placed in the cache. But as objects are included in the cache, the size is recalculated to be the size not yet included 630 in the cache. The benefit ratio 640 is the access rate divided by the size not yet included which is therefore also dynamically calculated whenever the size not yet included is modified.

Depending on the size constraint, a different combination is included in the cache. If the size constraint is small enough such that only one combination can be included, this method of the preferred embodiments may include the same results as the prior art knapsack method. For example, again beginning with the data shown in table 400 in FIG. 4, if the size constraint for the container used to store the objects is small, such as 1500, the method for this step is similar to prior art methods and includes the CN and Objectclass attributes. These are included because the first line of the table with CNObjectclass has the largest benefits ratio (0.33) where the size is within the size constraint of 1500.

However, if a larger size constraint is used such that there are multiple objects with high benefit ratios that have a cumulative size less than the constraint, the method herein analyzes the relationships of the objects to determine which objects should be placed in the cache. For the illustrated example of FIG. 6, using the data in table 400 and where the constraint is 3000, Objectclass, SN, and UID are included in the container because their combined initial benefit ratio of 0.36 is the largest. Then, all other rows are dynamically updated to reflect this change. Since the attributes Objectclass, SN, and UID are all now cached, they are programmatically removed from the keys for the object combinations, their sizes are removed from the size not yet included, and the benefit ratios are recalculated as depicted in table 600 shown in FIG. 6. Since ObjectclassSNUID has been included in the container, it is not shown in table 600.

From looking at the intermediate table shown in FIG. 6, one would assume that it would be most beneficial to include Givenname next since it has the highest benefit ratio. However, further analysis of the table in FIG. 6 shows that while the table has four rows, there really are only three rows left since the first two rows can be combined. After combining, we have three rows: one for CN, one for CNTitle, and one for Givenname. Thus, the method of the preferred embodiments combines all rows in which only individual attributes remain. Therefore, the first two rows above are combined and the access rate for CN becomes 1100, the size is still only 500, and the benefit ratio becomes 2.2. Therefore, the next attribute to include is CN which still fits within the constraint and the total size used is now 2750. The CN object is then removed from the object combinations in FIG. 6, resulting in the table 700 shown in FIG. 7.

Referring again to FIG. 7, the method then continues by re-analyzing the two remaining rows. The only row that is changed is the CNTitle row which becomes a row for Title only with a size of 200 and a benefit ratio of 1.25 since the attribue CN was added to the cache in the previous step. The method of the preferred embodiments would then include Title instead of Givenname even though the benefit ratio of Givenname is greater because both cannot fit and the access rate of Title is greater. This example is then complete according to the method of the preferred embodiments. The objects placed in the container for this embodiment are then shown in table 800 in FIG. 8.

Figure 9:
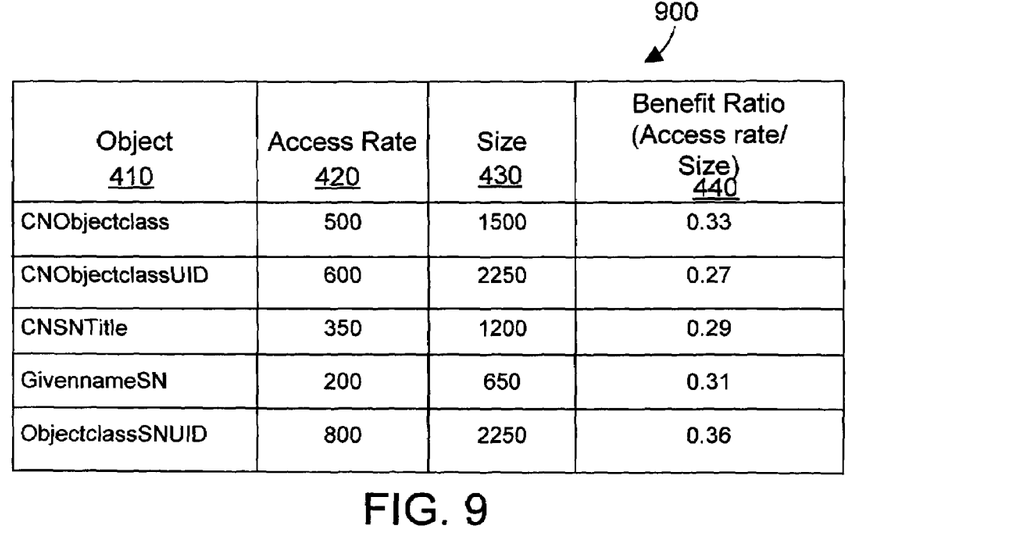
FIG. 9 is a table illustrating another example of attribute caching according to the preferred embodiments.

Now referring to FIG. 9, another example will be described according to the preferred embodiments to show how the last group to be added into the container can be analyzed. In this example, the size constraint of the container again is 1500 but the benefit ratios are different. This preferred embodiment would add combined objects to the cache, starting with the object which has the largest benefit ratio in the same manner as described before until the last group that meets the size constraint is found. For the constraint of 1500, the first object chosen would be CNObjectclass because it has the largest benefit ratio (0.33) within the size constraint. Bus since the size of CNObjectclass (1500) meets the size constraint, a determination is made whether to take this group or whether there is a combination of smaller groups with a higher benefit ratio. In this case, it is observed that CNSNTitle and GivennameSN have a combined size less than the constraint size (1200+650−500 for the duplication of object CN). Since these smaller groups combined have a larger access rate (350+200=500), the CNObjectclass group is eliminated from consideration, and the smaller groups are processed in a like manner as before. In this case, the CNSNTitle group would be added, and then the remaining rows would be analyzed as described above. After re-analyzing, the GivennameSN group would be added since it is the last group within the remaining constraint size.

The above methods can similarly be applied "in reverse" to update a changing cache in a changing environment. For example, during autonomic caching where an attribute table was cached, but it no longer should be cached based upon either access rate or size changing (or both). The attribute that is no longer cached needs to be added back into the correct object combinations and sizes not included and the benefit ratio needs to be recalculated to ensure that only those attributes with the greatest benefit within the configured constraint are included in the caching.

This method described above and illustrated with the previous example can be applied to any application where combinations of objects are required in order to solve a problem and the objects are used within multiple combinations. The relationship between the combination of objects as well as information on the individual objects (i.e., in this case, their sizes) must be kept. These variables are required in order to apply the method to object combinations where objects already included modify the factors of other combinations in order to produce new combinations for every iteration. For example the above method could be used in a database environment or other memory storage environment to determine what are the most beneficial items to store in local memory cache for better access times to the more used items. Thus the preferred embodiments are directed to all knapsack or cache applications where the objects to be stored have relationships to other objects that affect the benefit of a single object being placed in the container (cache). Again referring to FIG. 1, further embodiments of the present invention allow the user or system administrator to set up parameters 126 to control the autonomic caching of attributes in an attribute cache 125 by an autonomic cache controller 124 as described in the example above. The autonomic cache controller 124 is a software routine that operates using the cache parameters 126 to determine how to cache and which attributes to cache to enhance system performance. The autonomic cache controller 124 has a user interface (not shown) to allow the system administrator to set the parameters as described below. In preferred embodiments, the autonomic cache controller is part of the directory server 123. In other embodiments, the autonomic cache controller 124 is part of a database engine (not shown) of database 127 and operates in the same manner as described herein for a directory controller.

The cache parameters of the preferred embodiment include the following:

Cache Parameter: AttributeAutoAdjust—This is a boolean (TRUE|FALSE) parameter that allows the system administrator to turn on and off autonomic caching. When autonomic caching is off, the cache functions as a prior art manual cache and only what is specified in the Cache Parameter: AttributeName is placed in the cache. When autonomic caching is on, the directory server caches attributes according to the other parameters as described herein.

Cache Parameter: AutoAdjustTime—T000000 to T235959—This parameter is a value that allows the system administrator to determine a time boundary on which to perform autonomic caching. The parameter sets a fixed time of day (hours-minutes-seconds) as a boundary on which to perform caching.

Cache Parameter: AutoAdjustTimeInterval—The interval in hours between the times the server autonomically caches. For example, if autoadjusttime is T060000 and timeinterval is 4, the server will autonomically cache at 2 a.m., 6 a.m., 10 a.m., 2 p.m., 6 p.m., and 10 p.m.

Cache Parameter: Size—The maximum amount of memory in kilobytes to use for auto caching.

Cache Parameter: AttributeName—This parameter may comprise several rows of attribute names. The names in this cache are used when the server is in a manual cache mode (Cache Parameter: AutoAdjust=false). The names in this cache are also used for auto caching at startup and when auto caching hasn't yet been updated or when the auto cache doesn't take up the maximum amount of memory. For example, if Cache Parameter: AutoAdjust was false and then modified to true, the server will cache whatever is listed here until the next auto cache runs automatically at the time/interval specified. Or, if auto cache has been executed and the attributes that have been autonomically detected to cache only take up a portion of the memory, the attributes in AttributeName will also be cached.

Figure 10:
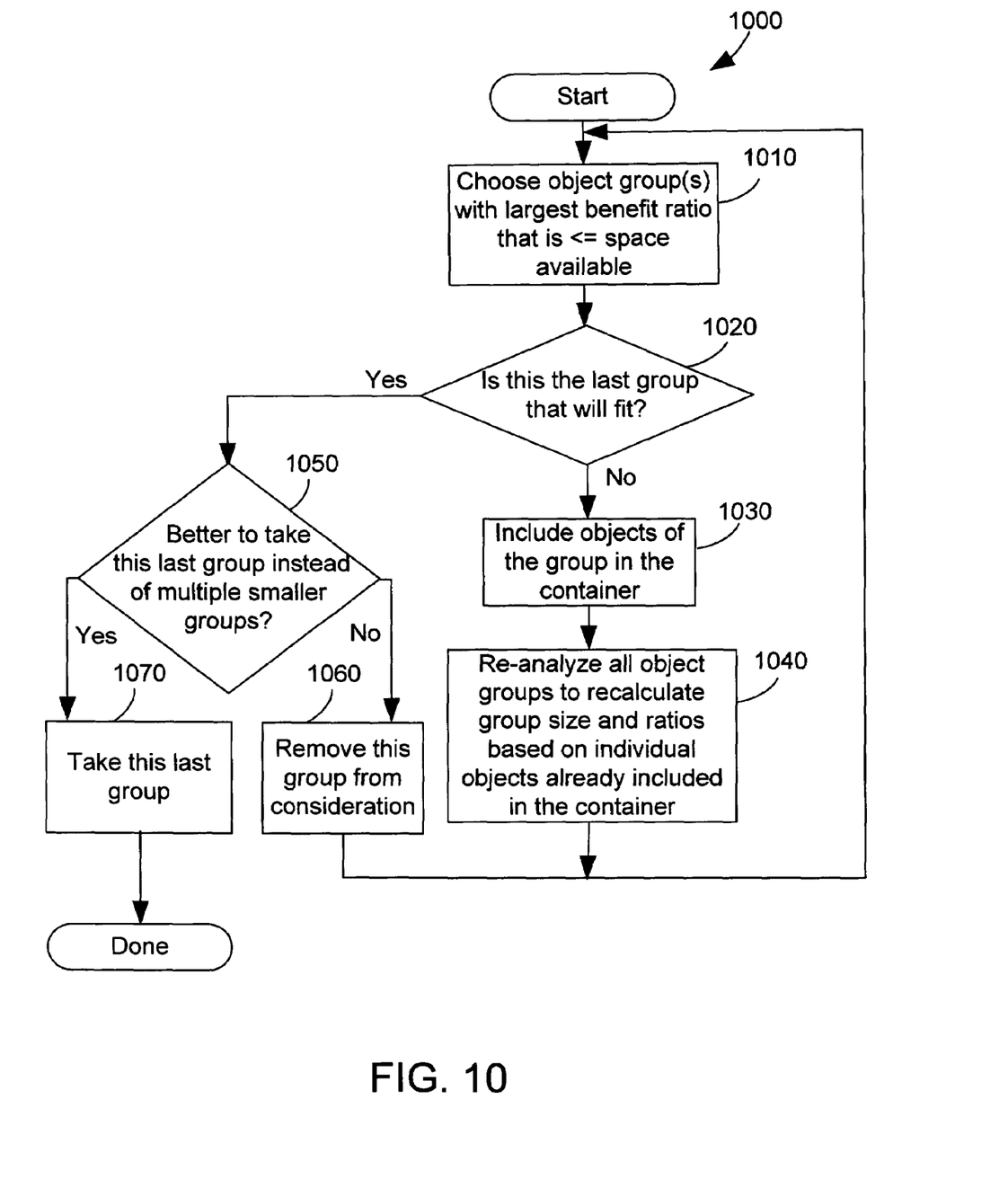
FIG. 10 is an example flow diagram of a method for determining the placement of objects in a container where the objects have relationships to other objects that affect the benefit of placing the object in the container according to preferred embodiments.

Referring now to FIG. 10, a flow diagram shows a method 1000 for determining the placement of objects in a container where the objects have relationships to other objects that affect the benefit of placing the object in the container according to preferred embodiments. Method 1000 is presented as a series of steps performed by a computer software program such as the autonomic cache controller 124 in the memory 120 described above with reference to FIG. 1. The method 1000 first chooses the object group or groups with the largest benefit ratio that have a combined size that is less than or equal to the constraint (step 1010). The remaining object groups are then checked against the remaining constraint size to see if the selected group is the last group that will fit in the container (step 1020). If the selected group is not the last group (step 1020=no) then the objects of the selected group are included in the container (step 1030). The object groups are then re-analyzed as described above to recalculate the size not yet included of each group and the benefit ratio (step 1040). The method then returns to step 1010. If the selected group is the last group that will fit in the container (step 1020=yes) then the selected group is analyzed with the remaining object groups to determine if this last selected group is more beneficial to place in the container instead of the next multiple smaller groups (step 1050). If it is more beneficial to take this group (step 1050=yes) then the selected group is placed in the container and the method is done. If it is more beneficial to take the next smaller groups (step 1050=no) then the selected group is removed from consideration and the method returns to step 1020 to consider the remaining groups.

The described steps above could also be viewed as being performed by the operating system 122 where the directory server 123 is part of the operating system 122. Further, the described steps could be performed by a database engine to cache accesses to data in a database directly without the services provided by a directory server.

The present invention as described with reference to the preferred embodiments provides significant improvements over the prior art. The described apparatus and method provide an efficient method for determining the placement of objects in a cache where the objects have relationships to other objects that affect the benefit of placing the object in the cache. The present invention provides a way to accurately cache most-used information within a given constraint to improve performance of computer data systems.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor; and
   a container controller residing in the memory that autonomically determines what objects to cache based on one or more preset parameters and a plurality of previous accesses to a server;
   where relationships between the objects are used to determine which objects are more beneficial to place in a cache by:
   determining a plurality of object groups each object group having a corresponding size, based on a plurality of previous accesses to the cache;
   determining if the size of the cache is small with respect to the corresponding size of said each object group of the plurality of object groups and choosing an object group with the largest benefit ratio, where the corresponding size is less than or equal to the size of the cache;
   analyzing the plurality of object groups to determine an access rate, the corresponding size and the largest benefit ratio resulting from accesses to the cache from one or more client computers;
   choosing the object group with the largest benefit ratio that has the corresponding size is less than a space remaining in the cache to add to the cache;
   re-analyzing the plurality of object groups to adjust the corresponding size and the largest benefit ratio after removing a size of common objects chosen in a previous step from the corresponding size of the plurality of objects groups that were not chosen in the previous step;
   determining space remaining in the cache; and
   where space remaining in the cache is greater than or equal to the smallest remaining object, repeating the step of choosing and the step of re-analyzing.

2. The apparatus of claim 1 wherein the one or more preset parameters can be modified by a system administrator.

3. The apparatus of claim 2 wherein the one or more preset parameters are chosen from the following: AutoAdjustOn, AutoAdjustTime, AutoAjustTimeInterval, Size, and AttributeName.

4. The apparatus of claim 1 wherein the container controller is part of a directory server that receives data requests from one or more client applications and autonomically determines what objects to cache in the container, and the preset parameters are attributes of the directory server.

5. A method for determining which objects to cache in a computer data system that includes one or more processor, the method comprising the steps of:
   where relationships between the objects are used to determine which objects are more beneficial to place in a cache by:
   determining a plurality of object groups each object group having a corresponding size, based on a plurality of previous accesses to the cache;
   determining if the size of the cache is small with respect to the corresponding size of said each object group of the plurality of object groups and choosing an object group with the largest benefit ratio, where the corresponding size is less than or equal to the size of the cache;
   analyzing the plurality of object groups to determine an access rate, the corresponding size and the largest benefit ratio resulting from accesses to the cache from one or more client computers;
   choosing the object group with the largest benefit ratio that has the corresponding size is less than a space remaining in the cache to add to the cache;
   re-analyzing the plurality of object groups to adjust the corresponding size and the largest benefit ratio after removing a size of common objects chosen in a previous step from the corresponding size of the plurality of objects groups that were not chosen in the previous step;
   determining space remaining in the cache; and
   where space remaining in the cache is greater than or equal to the smallest remaining object, repeating the step of choosing and the step of re-analyzing.

6. The method of claim 5 wherein a directory server autonomically determines which object to cache based on one or more preset parameters set by a system administrator.

7. The method of claim 6 wherein the one or more preset parameters are chosen from the following: AutoAdjustOn, AutoAdjustTime, AutoAjustTimeInterval, Size, and Name.

8. The method of claim 6 wherein the cache is part of an LDAP type directory server.

9. A program product comprising:
   at least one processor;
   a memory coupled to the at least one processor; and
   a directory server that receives data requests from one or more client applications and autonomically determines what objects to cache based on one or more preset parameters and a plurality of previous accesses to a directory server;
   where relationships between the objects are used to determine which objects are more beneficial to place in a cache by:
   determining a plurality of object groups each object group having a corresponding size, based on a plurality of previous accesses to the cache;
   determining if the size of the cache is small with respect to the corresponding size of said each object group of the plurality of object groups and choosing an object group with the largest benefit ratio, where the corresponding size is less than or equal to the size of the cache;
   analyzing the plurality of object groups to determine an access rate, the corresponding size and the largest benefit ratio resulting from accesses to the cache from one or more client computers;
   choosing the object group with the largest benefit ratio that has the corresponding size is less than a space remaining in the cache to add to the cache;
   re-analyzing the plurality of object groups to adjust the corresponding size and the largest benefit ratio after removing a size of common objects chosen in a previous step from the corresponding size of the plurality of objects groups that were not chosen in the previous step;
   determining space remaining in the cache; and
   where space remaining in the cache is greater than or equal to the smallest remaining object, repeating the step of choosing and the step of re-analyzing; and
   (B) computer-recordable media bearing the directory server.

10. The program product of claim 9 wherein the one or more preset parameters can be modified by the system administrator.

11. The program product of claim 10 wherein the one or more preset parameters are chosen from the following: AutoAdjustOn, AutoAdjustTime, AutoAjustTimeInterval, Size, and Name.

12. The program product of claim 9 wherein the directory server is an LDAP type directory server.

* * * * *